(12) United States Patent
Lin et al.

(10) Patent No.: US 10,467,029 B1
(45) Date of Patent: Nov. 5, 2019

(54) PREDICTIVE GRAPHICAL USER INTERFACES

(71) Applicant: Amazon Technologies, Inc., Reno, NV (US)

(72) Inventors: Kuan Lin, Tustin, CA (US); Mark Biales, San Jose, CA (US); Zhen-Zhong Luo, Irvine, CA (US); Michael Hughes, Irvine, CA (US)

(73) Assignee: Amazon Technologies, Inc., Seattle, WA (US)

( * ) Notice: Subject to any disclaimer, the term of this patent is extended or adjusted under 35 U.S.C. 154(b) by 251 days.

(21) Appl. No.: 15/438,495

(22) Filed: Feb. 21, 2017

(51) Int. Cl.
*G06F 3/048* (2013.01)
*G06F 9/451* (2018.01)

(52) U.S. Cl.
CPC .................... *G06F 9/451* (2018.02)

(58) Field of Classification Search
CPC ........................................................ G06F 9/451
USPC .......................................................... 715/765
See application file for complete search history.

(56) References Cited

U.S. PATENT DOCUMENTS

| | | | | |
|---|---|---|---|---|
| 8,375,313 B2* | 2/2013 | Ngan | ................ | G06F 11/3692 382/209 |
| 8,869,049 B1* | 10/2014 | Li | ............................ | G06F 3/00 715/705 |
| 9,069,374 B2* | 6/2015 | Sudhakar Palla | ......... | G06F 3/14 |
| 9,161,172 B2* | 10/2015 | Poduri | ................... | H04W 4/029 |
| 9,367,123 B2* | 6/2016 | Jain | .......................... | G06F 15/16 |
| 9,626,097 B2* | 4/2017 | Jeon | ...................... | G06F 3/04883 |
| 9,798,760 B2* | 10/2017 | Sayers | .................... | G06Q 30/06 |
| 9,946,437 B2* | 4/2018 | Anbil Parthipan | .... | G06N 5/022 |
| 2009/0094544 A1* | 4/2009 | Savage | ................. | G06F 3/0481 715/765 |
| 2011/0225291 A1* | 9/2011 | Dobroth | ................. | G06Q 10/10 709/224 |
| 2012/0021774 A1* | 1/2012 | Mehta | ................ | G06Q 30/0282 455/456.3 |
| 2012/0291022 A1* | 11/2012 | Mehta | ....................... | G06F 8/60 717/176 |
| 2013/0085886 A1* | 4/2013 | Satish | .................... | G06Q 30/02 705/26.7 |
| 2014/0089531 A1* | 3/2014 | Bhogal | ................. | G06F 9/4411 710/8 |
| 2014/0137080 A1* | 5/2014 | Huang | ................. | G06F 9/44505 717/121 |
| 2017/0131867 A1* | 5/2017 | Anbil Parthipan | .... | G06N 5/022 |

* cited by examiner

Primary Examiner — David Phantana-angkool
(74) *Attorney, Agent, or Firm* — Hogan Lovells US LLP

(57) ABSTRACT

Based on a user's current action in an application, a set of the most likely actions to be taken next by a user is determined, such as based on a historical sequence of actions that the user, or a number of other users, have taken in the past. Based on historical sequence of events, a predictive GUI may be generated that can be dynamically updated automatically based on actions that are determined to be undertaken next by the user.

17 Claims, 12 Drawing Sheets

PREDICTIVE GRAPHICAL USER INTERFACES

BACKGROUND

As computing devices become more powerful and are used for increasingly complex tasks, the interfaces by which humans interact with the devices and the software executing thereon can be unwieldly and overly complicated. For example, software ranging from an image processing application to an integrated development environment (IDE) for application development can have thousands of commands and keyboard shortcuts, along with numerous toolbars, palettes, and menu items. In many cases, the sheer breadth of the interfaces for modern software can impede users from even learning about and accessing various features offered by the software.

BRIEF DESCRIPTION OF THE DRAWINGS

Various embodiments in accordance with the present disclosure will be described with reference to the drawings, in which.

DETAILED DESCRIPTION

Figure 1A:
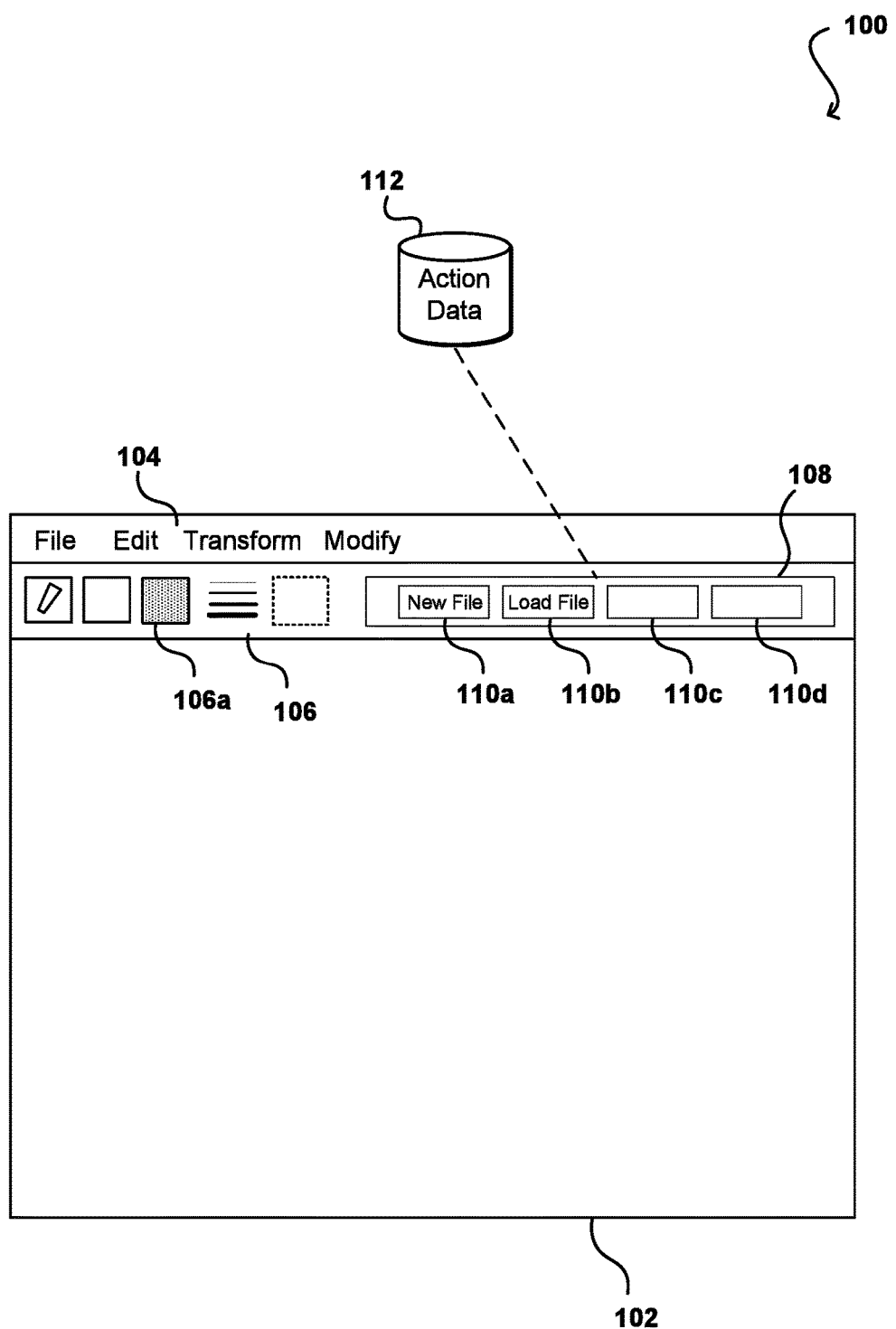
FIGS. 1A-1C illustrate an example environment for providing predictive graphical user interface elements that can be used in accordance with various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches in accordance with various embodiments provide for determining various interactions a user may have with a graphical user interface (GUI) of a software application; for example, selecting a menu item, which results in an action or event to occur or be performed in the application. In one embodiment, a user may interact with an application's GUI (or other interfaces in some embodiments, such as a scripting interface, etc.) in order to cause an event to be received by the application, which may result in some action being performed with respect to the application, such as accessing a feature, opening a dialog box, performing a command, manipulating an object, etc. References to interactions and interaction types, and instances of interactions being performed by an application in the present disclosure may also be considered to apply to events, event types, and events being caused to be performed by an application, such that the terms are not exclusive of each other.

The interactions performed in an application and/or events received by the application may be determined in one embodiment by receiving telemetry data from the application; for example, mouse movement data, mouse clicks, keyboard input, trackpad input, menu selections, windows opened/closed, dialog box prompts/confirmations, objects manipulated, etc. In one embodiment, an application may run locally on a user's machine or may be accessed over a network; for example, in a cloud-based service, such as a Software-as-a-Service (SaaS) environment, and the telemetry data may be determined on the user's machine that is executing the application and stored locally for further use, and/or may be sent over a network, such as to a resource provider environment (e.g., a cloud computing environment) that includes components, instances, and/or processes for analyzing and utilizing the data, as well as to the application executing on a remote computing device, for example. In one embodiment, data representing or indicating interactions with an application, whether the application is executing on a user's local machine or in a resource provider environment, for example, may be recorded and associated with a particular user, a particular session of the user's, geography, time of day, as well as other identifiers.

In one embodiment, multiple users are interacting with an application. For example, in a game development integrated development environment (IDE), some users may be running a local copy of an application on their devices, while others may be accessing the application over a network, where the application is running on a server, such as in a SaaS environment. In one embodiment, as a user interacts with an application, telemetry data is captured that describes a sequence of actions that the user performed, features that the user used, windows that the user opened, etc., which may be thought of as a result of interactions/events with respect to the application. For example, in one embodiment, telemetry data may be gathered and stored that represent a sequence of actions such as "application session started," "clicked on 'File' menu," "selected 'Open' menu option," "opened File1.dat," etc. In one embodiment, each user is performing their own sequence of actions with regard to the application and the telemetry data allows for each user's history of interactions to be recorded and stored, as well as associated with the user, anonymously in an embodiment. In an embodiment, as discussed more fully herein, the aggregate data for numerous users may be utilized for generating GUI elements that are predicted based on telemetry data of individual users or an aggregation telemetry data corresponding to multiple users.

In one embodiment, once a user has a history of interactions recorded in the interaction history data (e.g., data that indicates a sequence of types of actions/events/interactions, etc.), then the data may be used to predict an action a user will likely perform next, given a current action, and this prediction used to modify the application GUI in order to display a GUI element, for example, that allows the user to easily perform the predicted action, such as by interacting with the GUI element. In one embodiment, an application has a dynamic menu bar displayed in the application GUI that is modified based on a prediction of what the user will want to do next in the application, given the interaction history data. In one embodiment, application GUI features are displayed according to whether their use meets or exceeds some minimum threshold. For example, in one embodiment, if the data indicates that a user, after beginning a new session with the application, utilizes "Feature A" 73% of the time and "Feature B" 25% of the time, then the dynamic menu bar may be modified so that a button is displayed that is associated with "Feature A" and a button associated with "Feature B" is also displayed in the menu bar, such that the user may click on the button for "Feature A" or "Feature B" and that associated event/interaction/feature will be performed by the application. For example, in one embodiment, if the user clicks the button for "Feature A" on a dynamic menu bar, then data will be sent to a corresponding application that causes that feature to be performed in the application just as if the user had selected the feature by the "normal" route of accessing a menu item, going into a dialog box, entering values in a GUI input field, etc. In one embodiment, by providing predictive, on-demand GUI elements that allow users to access features that are likely to be used based on predicted future actions of a user in the context of their current actions/interactions/events within an application, at least one embodiment is an advancement over current GUI approaches that merely offer static button "shortcuts" for various commands.

At least one embodiment, therefore, provides GUI elements that enable improved user interface techniques, which in various embodiments utilize telemetry data and predictive approaches, among other things, in order to display and provide support for simplified selection of various features, commands, GUI elements, and/or other aspects of software applications, for example. GUIs, screen size and display space may be at a premium in certain devices, such as with mobile computing devices; also, as described above, the complexity and breadth of modern software applications can render current GUI approaches inefficient. Therefore, the techniques described herein provide, among other things, a technical solution to a technical problem that arises in the context of the internet, GUIs and computer software. By providing novel techniques for, among other things, predicting various aspects of an application that a user may want to utilize and surfacing GUI elements that are more easily identified and selected by a user, the functioning and capability of software, computer(s), and systems (e.g., distributed computing systems, databases, etc.) may be improved, according to various embodiments; for example, problems inherent in GUIs relating to speed, accuracy, usability, and the like may be alleviated by the approaches described herein.

Various other functions can be implemented within the various embodiments as well as discussed and suggested elsewhere herein.

Figure 1B:
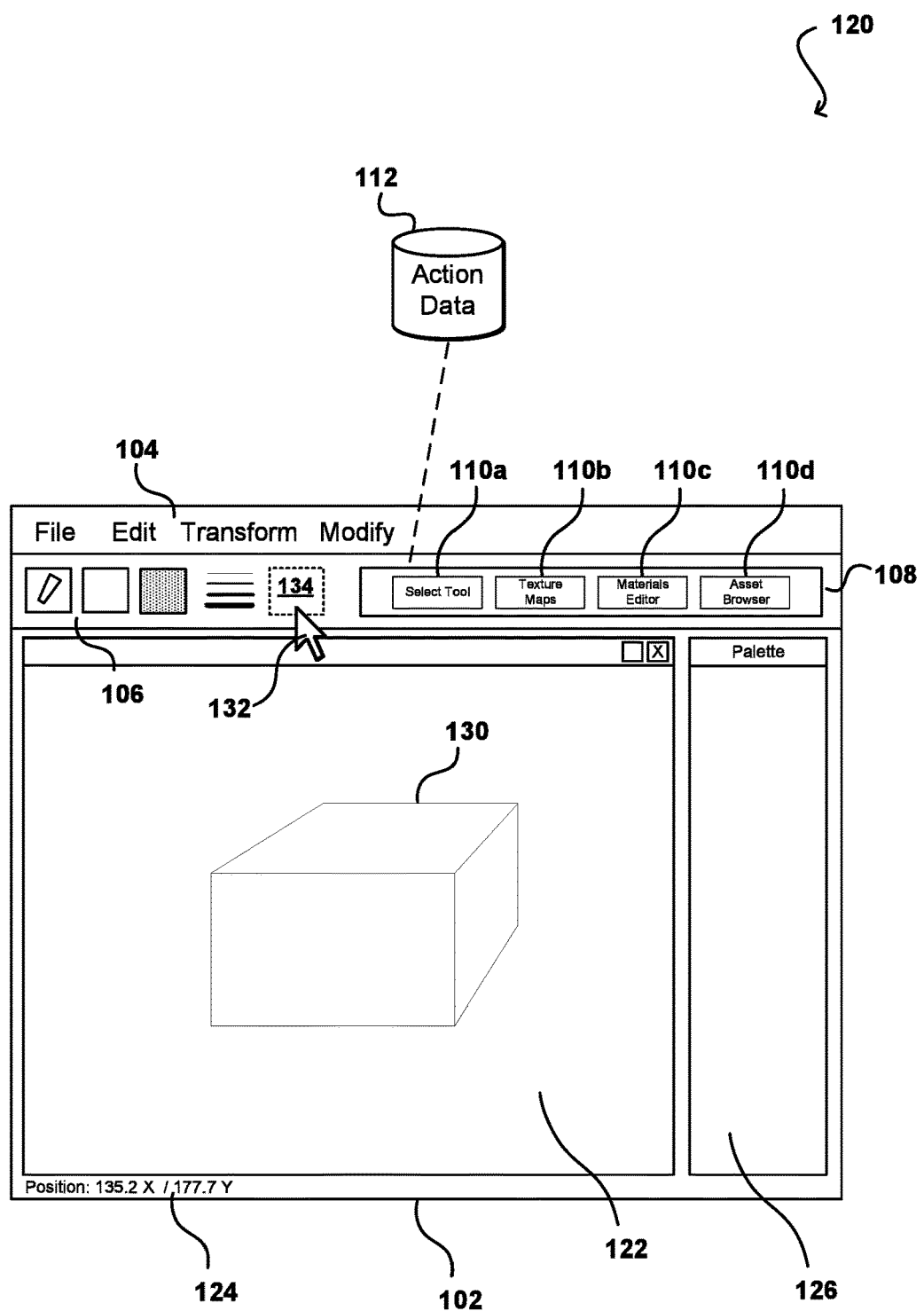
Figure 1C:
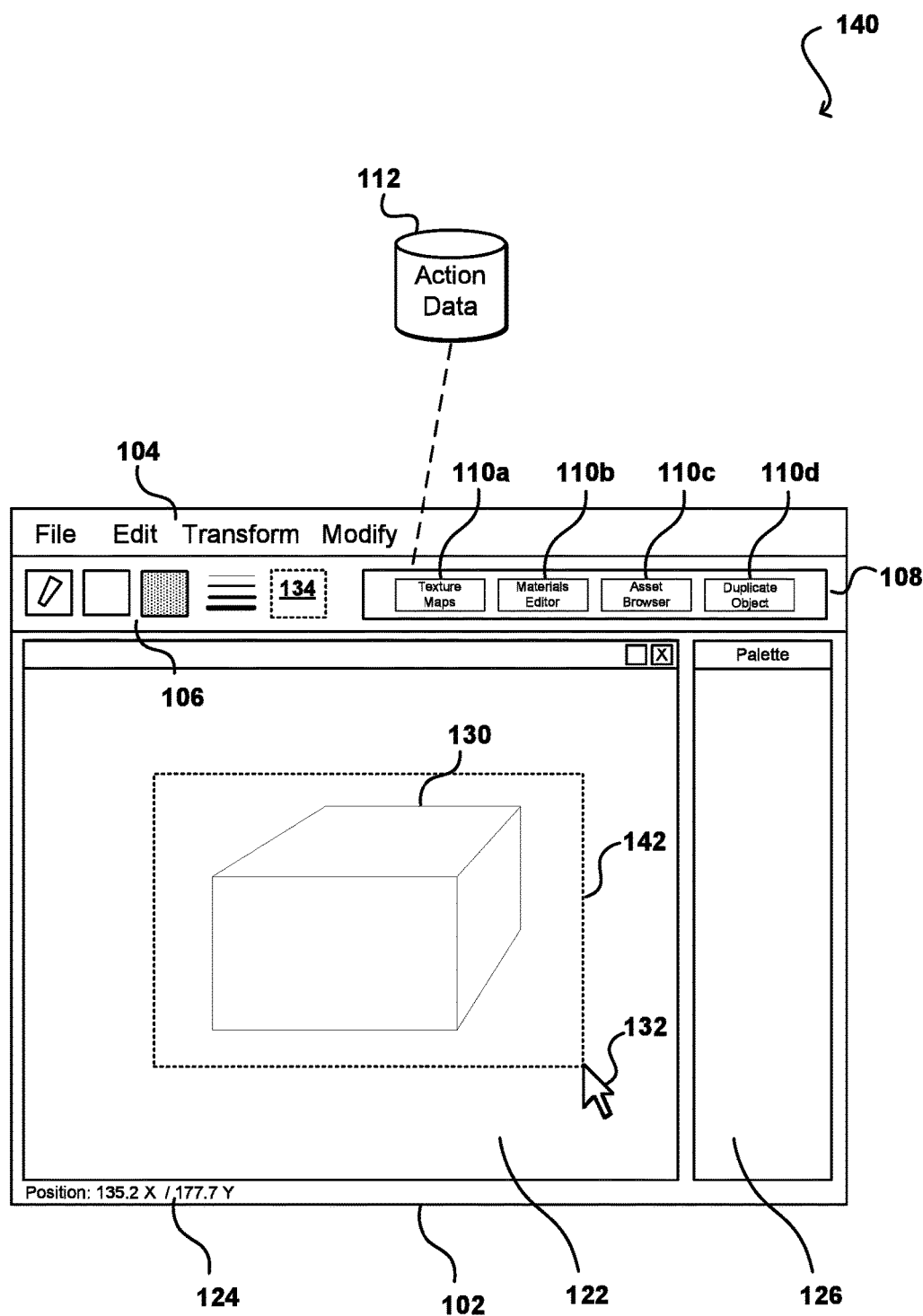

FIGS. 1A-1C illustrate an example environment for providing predictive graphical user interface elements that can be used in accordance with various embodiments. In the example 100 of FIG. 1A, a window 102 in a GUI of an application is illustrated. The window 102 has a menu bar 104 and a toolbar 106 that includes selectable elements 106a that, when selected, provide access to various features of the application. The example 100 of FIG. 1A further illustrates an embodiment of the present techniques that utilizes a dynamic menu bar 108, within which various GUI elements such as buttons 110a-110d may be generated, displayed, modified, etc. While a menu bar and button UI elements are illustrated with regard to FIGS. 1A-1C, the present techniques are not so limited, and may be utilized in numerous variations of interface elements, as well as with other, non-graphical interfaces such as a text-based scripting interface, etc., as described more fully herein.

In one embodiment, the dynamic menu bar 108 is modified based on action data 112, which may be stored locally on the user's machine and/or remotely, in which case according to one embodiment the action data stored remotely is communicated over a network to an application, which uses the action data, or is caused by the action data, to modify the dynamic menu bar 108 in some way. For example, the user operating an application in the example of FIG. 1A may have action data 112 stored locally that, as discussed more fully herein, includes interaction history data describing a historical sequence of types of interactions the user had with an application (e.g., with some aspect of the GUI, a scripting interface, etc.) in previous sessions. As an example, once the user opens an application, an interaction type of "session start" may be determined by an application. In one embodiment, an application accesses the action data 112 for the user, which indicates that after an interaction type of "session start," the user previously utilized the "New File" command 50% of the time and the "Load File" command 40% of the time. In one embodiment, based at least on data indicating frequencies of historical interactions, it may be determined that the user is likely to select the "New File" command or the "Load File" command next. As a result in this example, two buttons 110a, 110b are generated and displayed in the dynamic menu bar 108 that may indicate to the user (e.g., by being descriptively labeled) that when an indication is received that the buttons 110a, 110b have received an interaction, the labeled action will be performed by a corresponding application. For example, if the user interacts with the "New File" button 110a, then the "New File" command will be performed in a corresponding application.

In one embodiment, a dynamic menu bar 108 (or other GUI element that utilizes the techniques described herein) may already have a number of buttons 110a-110d displayed, and one or more of the buttons 110a-110d may be dynamically modified to reflect likely actions a user will want to perform next (e.g., actions having the highest frequency according to action data 112, etc.).

In the example 100 of FIG. 1A, a user has just opened an application, which resulted in a corresponding application window 102 and corresponding GUI elements to be displayed. In one embodiment, this may be considered a start of a "session" for a user with regard to an application. If the user uses an application for two hours and closes the application, then the user has engaged in a two-hour session. If the user subsequently opens that particular application again, then a new session is begun. In one embodiment, the action data 112 may include interaction history data that is associated not only with particular users, but also with one or more particular sessions corresponding to a user.

In the example 120 of FIG. 1B, the user has opened a file and the GUI has been modified in response. For example, a document window 122 may be displayed in an application window 102 on a display. A status region 124 may provide information relevant to an application, such as parameters of a selected object, etc. Additional GUI elements such as palettes 126 may be displayed within an application GUI. The opened document in this example contains an object 130 that the user may operate on using application features. In one embodiment, after an interaction type (e.g., "open document," etc.) is determined, then the action data 112 is analyzed to determine various interaction types that are likely to be utilized next by the user, based on the user's historical sequence of interactions and a relative frequency of interactions occurring subsequent (immediately subsequent, in one embodiment) to a corresponding application performing a similar or identical interaction type (e.g., "open document"). In this particular example, there are four interaction types that are determined to be most likely performed next by the user (e.g., after opening a document). The dynamic menu bar 108 in this example has four buttons 110a-110d, which in FIG. 1A, had been dynamically modified such that two of them were associated with a predictive interaction type. In this example, once the user has performed a new action (e.g., "open document"), and the new predictions are performed, then the dynamic menu bar 108 is dynamically modified such that buttons 110a-110d have been modified to display labels corresponding to the four likely subsequent interaction types: "Select Tool," "Texture Maps," Materials Editor," and "Asset Browser." The "Select Tool" button 110a corresponds in this example to the interaction of the user selecting the "select tool," which is triggered by clicking 132 on the "select tool" icon 134 in application toolbar 106.

In this example, the user may select the dynamic button 110a associated with the "Select Tool" interaction type, which will send an instance of the "Select Tool" interaction type to an application, or may click 132 on the "select tool" icon 134 in application toolbar 106. In one embodiment, other shortcuts may be available to the user, such as a keyboard shortcut. The use of a dynamic button 110a for an interaction type available from a prominent GUI element provides a helpful, prominently labeled target for a user to select. The user may be a novice and not recognize the "select tool" icon 134 in application toolbar 106, nor know the keyboard shortcut; therefore, a predictive GUI as discussed herein solves problems inherent in GUIs. In one embodiment, a total time a user has used an application may be tracked, as well as individual session times. In one embodiment, if the user has not used an application for a threshold amount of time, then a corresponding frequency of certain interaction types may be increased, such that they are determined to be "more likely" to be used. In one embodiment, this may be accomplished by modifying a frequency associated with a certain interaction type, according to the action data; for example, increasing it, such that when a determination of the "most likely" interaction types is made, then those certain interaction types may be found to be within a threshold range wherein they are selected to be displayed in the dynamic menu bar 108 (or other display element, depending on the embodiment).

In one embodiment, it may be determined that, as in the aforementioned example, a dynamic menu bar 108 has a button associated with an action that has a corresponding icon displayed on the screen (such as the "select tool" icon 134 in application toolbar 106). In one embodiment, a GUI effect may be displayed to alert the user of the associated icon. For example, if the user in this example selected the "Select Tool" button 110a in the dynamic menu bar 108, then the "select tool" icon 134 in application toolbar 106 may flash, be highlighted, have a circle drawn around it, or some other visual effect that alerts the user to the presence of the "select tool" icon 134 in application toolbar 106, which may in one embodiment be accompanied by explanatory text, audio, or other effect. In one embodiment, a link to a resource such as a manual or tutorial may be provided in a GUI element that when selected, takes a user directly to a relevant portion of the resource (e.g., describing the "select tool" icon 134 in application toolbar 106).

In the example 140 of FIG. 1C, the user has utilized the "select tool" to draw 132 a selection boundary 142 around object 130. In this example, this comprises an interaction type performed in an application of "select object." In one embodiment, in response to determining an interaction type, action data 112 is analyzed to determine one or more likely interaction types the user undertakes after selecting an object, and the GUI is subsequently modified to reflect these likely interaction types (e.g., dynamically modifying the buttons 110a-110d of the dynamic menu bar 108). In this example, the buttons 110a-110d are modified to correspond to "Texture Maps," "Materials Editor," Asset Browser," and "Duplicate Object." In one embodiment, upon receiving an indication of a selection of one of the dynamically modified buttons 110a-110d, then a respective interaction type (also, event type) will be performed by a corresponding application (e.g., an instruction is generated and sent to an application). For example, if the button associated with "Texture Maps" 110a is clicked on, then a dialog box corresponding to the "Texture Maps" function is opened and displayed on the screen, in one embodiment just as if the user had chosen that function through some other manipulation of the GUI (e.g., a menu selection, keyboard shortcut, etc.). It may be that the command to activate the "Texture Maps" feature is buried in a sub-menu of a sub-menu and takes several precise mouse movements to activate. By displaying the feature in an easily-clickable button, the user saves time and potential frustration if the user cannot remember which sub-menu of a sub-menu to select, thereby alleviating a problem inherent in complex GUIs.

As previously discussed, the action data 112 in an embodiment may represent sequences of actions taken by an individual user, in a single session or over multiple sessions. In one embodiment, action data 112 may also represent an aggregation of users and their historical sequences of actions, which may also limited by individual sessions, over time, etc. In one embodiment, this aggregated action data 112 may be collected on individual machines of the other users and transmitted over a network to a centralized location, such as a resource provider environment. In one embodiment, a user may have an agent or process on their machine (or an application itself may perform this task) that records the telemetry data (e.g., interactions, events, etc.) as they use an application and transmits the data over the network intermittently or in real-time. In one embodiment, one or more of the other users may be accessing an application over the network; for example, an application (e.g., an instance thereof) may be executing at a resource provider (e.g., in a cloud-based service, such as a SaaS environment), and the telemetry data is received by and stored at the resource provider without having to be transmitted from the user's machine. In one embodiment, telemetry data from users executing an application locally and users executing an application remotely may be received and analyzed to determine relative likelihoods of sequential actions.

In one embodiment, these relative likelihoods of sequential actions may be capable of being analyzed in different contexts. For example, with regard to specific documents that the user was working on at the time, including specific document types, as well as types of projects, objects being operated on, etc. For example, according to aggregate action data, a group of users included in the aggregate action data may have an overall 50% likelihood of performing "Action B" after they perform "Action A." However, when the users are working on a particular document type in an application, or manipulating a specific object type of an application, for example, then it may be determined that those users within the aggregate have a 60% likelihood of performing "Action C" after they perform "Action A." In one embodiment, a dynamic GUI element may be modified to reflect the overall aggregate, while in cases where the user in question is working on a particular document type or manipulating a specific object type, the dynamic GUI element may be modified to reflect probabilities (i.e., "sub-aggregate" probabilities) corresponding to those users that also were working on that particular document type or manipulating that specific object type. In one embodiment, the use of sub-aggregate probabilities may only be utilized if a certain threshold is met; for example, that at least a certain number of actions are recorded in the action sequences in the aggregate interaction history data, or a certain number of users are utilized in the computation of the sub-aggregate probabilities, etc. It should be understood that alphabetized actions, such as those above, are for illustrative purposes and are not limiting of particular actions that are capable of being utilized pursuant to the disclosed techniques.

In one embodiment, a predictive GUI as implemented for a particular user of an application may be based on individual interaction history data, aggregate interaction history data from a number of users (e.g., not including the particular user), or a combination of both, depending on the approach undertaken. For example, if the particular user is a new user of an application (as may be determined in various embodiments by tracking time spent in an application, number of sessions, length of sessions, number of commands activated by the user, number of sub-menus interacted with, or any other measure, which may relate to a user's experience, knowledge, familiarity with the interface, skill, etc.), then the predictive GUI may be based on aggregate interaction history data. In one embodiment, in order to determine whether to dynamically modify a button in a dynamic menu bar to correspond to a particular command after the user has taken a certain action, then the aggregate interaction history data may be analyzed to determine relative likelihoods of subsequent actions (i.e., what have most users done after they did this particular action). As the particular user becomes more experienced in an application (e.g., has spent a threshold amount of time using an application, has initiated a threshold number of sessions, etc.), then in one embodiment, the predictive GUI may be based on the particular user's interaction history (e.g., their historical sequence of actions). In one embodiment, a combination of individual interaction history data and aggregate interaction history data may be used; for example, when a user has more than x number of hours using an application but less than y hours. In one embodiment, a predictive GUI may comprise a dynamic menu bar with four buttons, and as the user gains more "experience," as may be measured by session number, length, etc., then the number of buttons modified based on individual interaction history data may increase and the number of buttons modified based on aggregate interaction history data may decrease, for example. In one embodiment, a predictive GUI may be statically divided such that a certain number of portions of the predictive GUI element are modified based on individual interaction history data and another number of portions are modified based on aggregate interaction history data (e.g., a four-button dynamic menu bar may provide two buttons dedicated to individual interaction history data and two buttons dedicated to aggregate interaction history data).

In one embodiment, a combination of individual interaction history data and aggregate interaction history data may also be used based on determined trends relating to a particular user. In one embodiment, it may be determined, such as based on an analysis of the individual interaction history data and the aggregate interaction history data, that a particular user uses a certain application feature more often than the aggregate number of users. For example, certain features may be associated with a certain type of project that the particular user works on more than most users. In one embodiment, these certain features may be identified and displayed (e.g., "bubbled up" or "promoted") more frequently in the predictive GUI than might be otherwise the case if determined by applications of the predictive analysis approaches. In one embodiment, a user may use "Feature A" over three times as often as an aggregate number of users tracked. Therefore, the predictive GUI may promote "Feature A" more often; for example, by boosting its relative frequency as indicated in the history data, lowering a threshold that "Feature A" should exceed in order to be displayed in the predictive GUI (e.g., modifying a button on a dynamic menu bar to be associated with "Feature A"), choosing to display "Feature A" in the predictive GUI every X number of times the predictive GUI is "refreshed" (e.g., every time a determination is made of which buttons to dynamically modify on a dynamic menu bar, etc.), etc.

In one embodiment, a predictive GUI may be customized, for example by a user. For example, a predictive GUI may at one point display a particular feature, action, etc. that a user may want to appear at a certain frequency; for example, every time after the user takes a certain action, all of the time, etc. In one embodiment, a user may identify (e.g., "pin") a portion of the predictive GUI such that the identified (e.g., "pinned") portion of the predictive GUI appears at a frequency different from that of other items, which may appear when they are determined to be above a threshold likelihood of being utilized subsequent to a particular interaction by the user with an application. A user may perform "Action A" in an application, such as creating an object. In one embodiment of the predictive GUI that utilizes a dynamic menu bar, it may be determined by the system that "Action B," such as an object editor dialog box, has a 20% likelihood of being the next action taken by a user, and a button on the dynamic menu bar may be dynamically modified to be associated with "Action B." The user may want this particular button to always be associated with "Action B" after the user takes "Action A," so the user may interact with the button on the dynamic menu bar (e.g., right-click and select a "pin" command, voice command, etc.) in a manner that causes that particular button (or another button in an embodiment, such as when buttons on the dynamic menu bar are ordered by probability, etc.) to always be associated with "Action B" after the user takes "Action A."

In one embodiment, a dynamic modification of the button to be associated with "Action B" occurs without regard to whether "Action B" has an associated likelihood (e.g., frequency) of being the subsequent action in the historical sequence of interactions; by "pinning" "Action B" in this manner, the user removes a possibility that future actions, or the actions of other users in embodiments where aggregate interaction history data is utilized to customize a predictive GUI, will affect the probability of "Action B" being determined to cause it to be placed in the predictive GUI. A user may "unpin" various interactions as well, such as interactions that were previously "pinned," or to indicate that a particular interaction should never be utilized in the predictive GUI. In embodiments where a dynamic menu bar is not used, other forms of input may be used to in some way cause an interface element corresponding to "Action B" to be available after the user takes "Action A."

According to one embodiment, a determination may be made regarding intervals at which to dynamically modify the predictive GUI. For example, a user may grow tired of buttons on a dynamic menu bar constantly changing (e.g., being dynamically updated in response to a determination that certain interactions or events are most likely desired by a user after a particular interaction or event), and may provide commands to alter the behavior of the predictive GUI. For example, the user may not want the predictive GUI to update (e.g., one or more buttons on a dynamic menu bar being dynamically updated after each action by a user), so in one embodiment, a predictive GUI may be modified such that a determination of a next most likely interaction by a user occurs every x number of interactions by the user, or that an interval since the last time the predictive GUI was modified may be determined, and only upon a particular interval being exceeded (e.g., every 10 seconds, every 10 commands, etc.) is the predictive GUI dynamically modified with respect to the last interaction by a user.

Figure 2A:
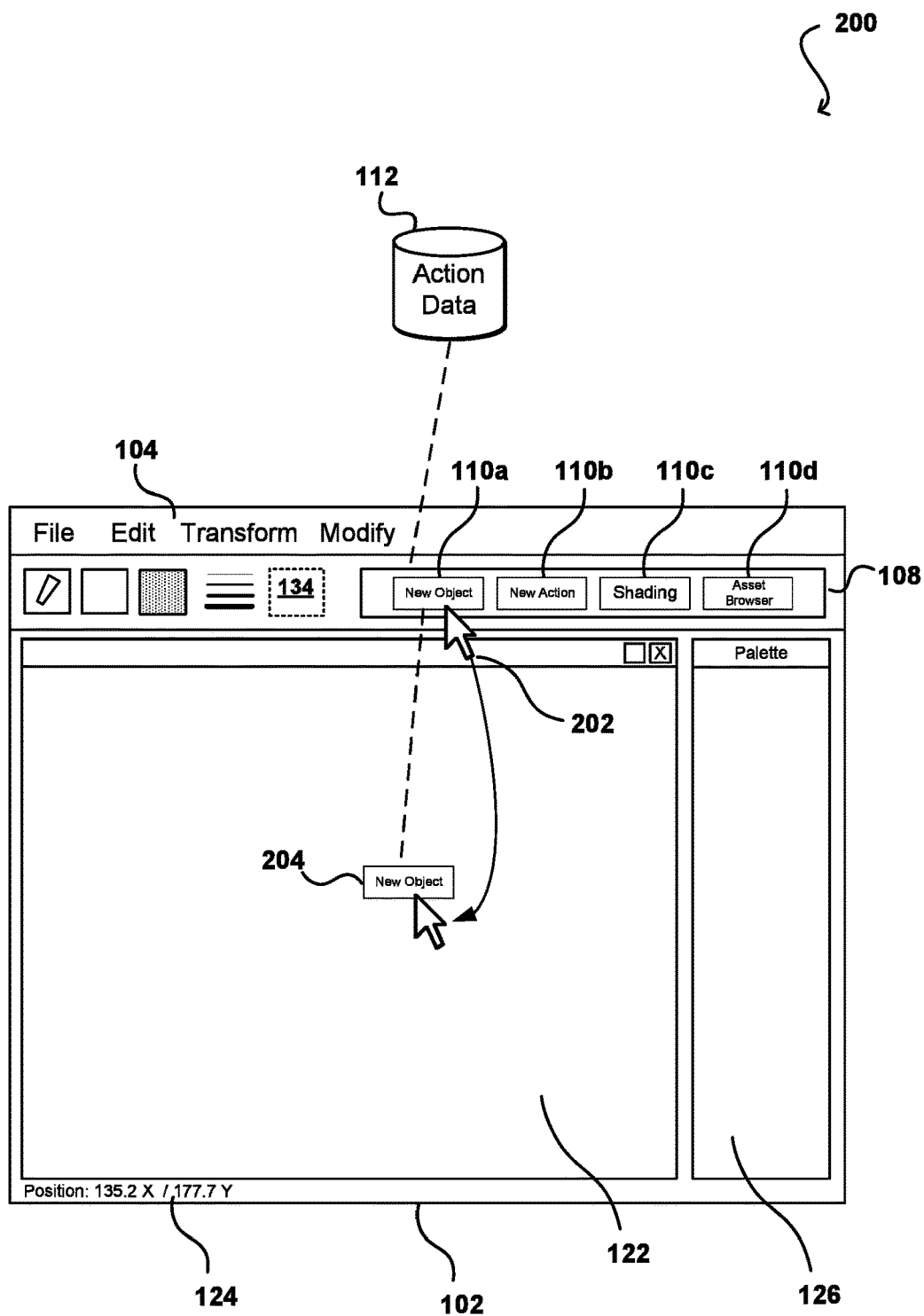
FIGS. 2A-2C illustrate an alternate environment for providing predictive graphical user interface elements that can be used in accordance with various embodiments.
Figure 2B:
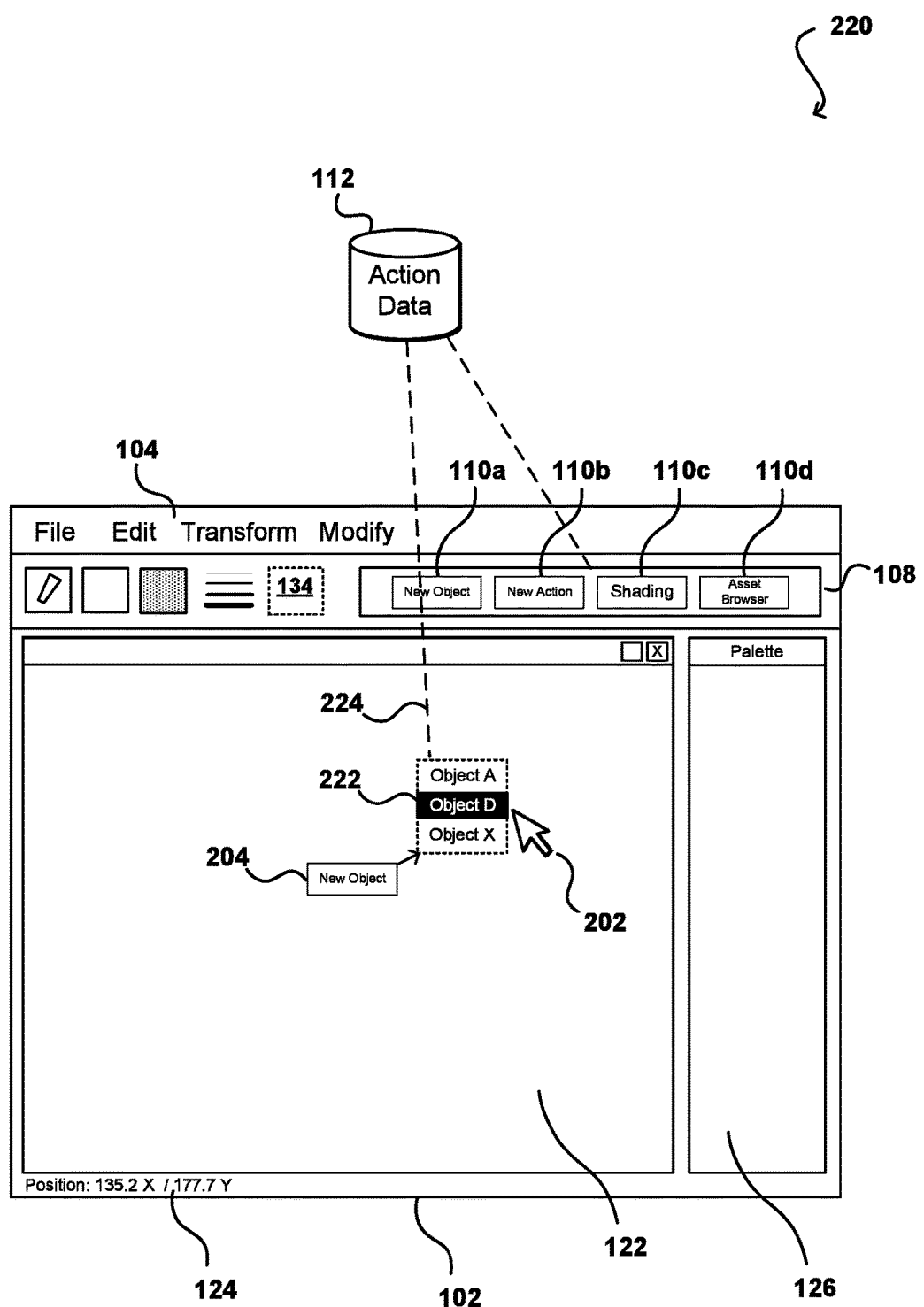
Figure 2C:
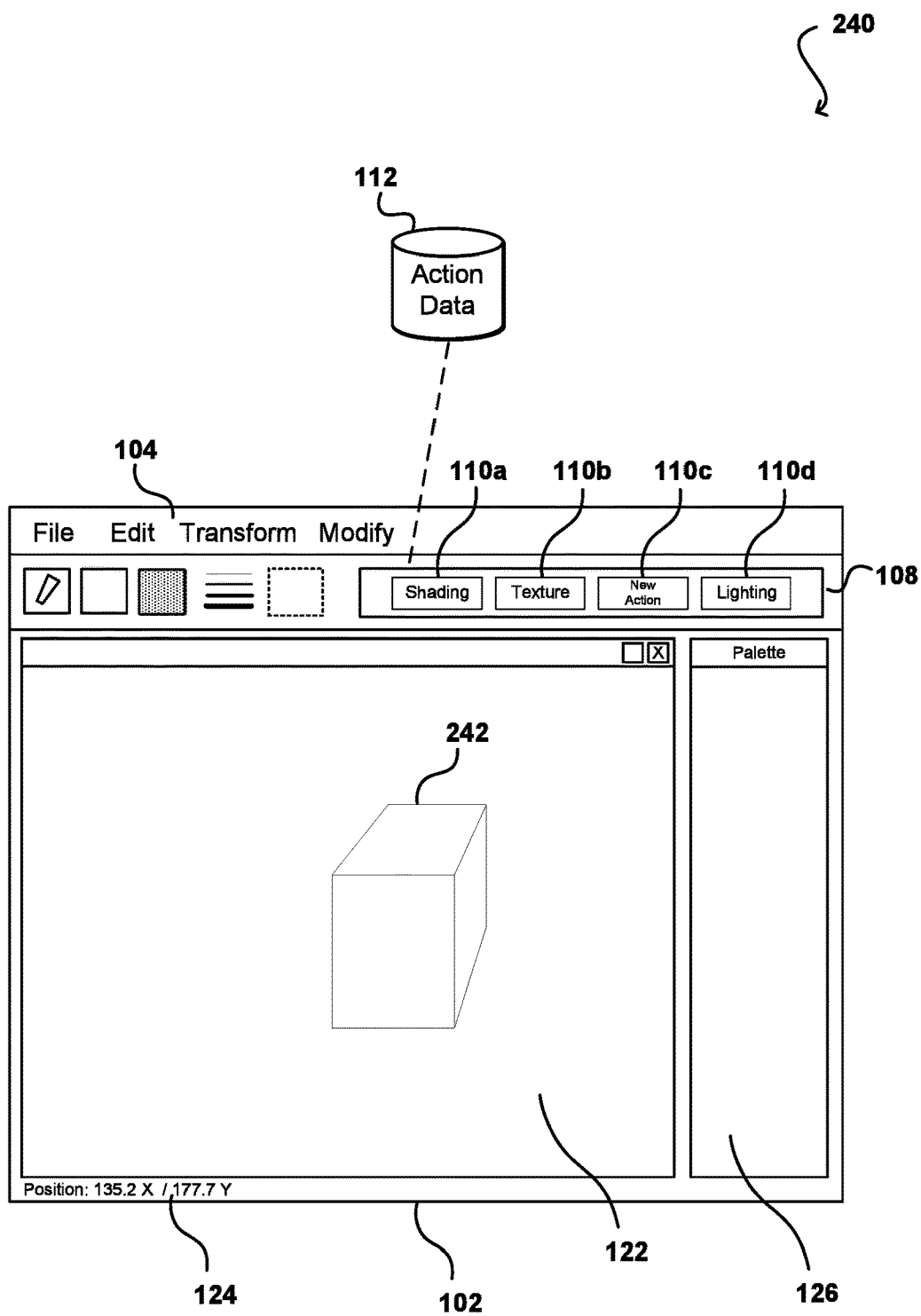

FIGS. 2A-2C illustrate an alternate environment for providing predictive graphical user interface elements that can be used in accordance with various embodiments. It should be understood that reference numbers may be carried over between figures for similar components for purposes of explanation, but that such use should not be interpreted as a limitation on the various embodiments. In the example 200 of FIG. 2A, a predictive GUI embodiment of a dynamic menu bar 108 with various dynamically modifiable buttons 110a-110d is illustrated. One of the buttons represents a "New Object" 110a. In one embodiment, a user may drag 202 a representation 204 of button 110a from dynamic menu bar 108 to document window 122. While, as discussed above, a user may in one embodiment simply click on the "New Object" button 110a in order to cause that interaction/event type to be performed by an application, in one embodiment a dragging approach, or other user interface technique, may be used to perform the same task or add contextual functionality. For example, in an embodiment, if the user were to click the "New Object" button 110a, then a "New Object" dialog box may appear in the GUI. However, a user may want more fine-grained control over a particular action.

In the example 220 of FIG. 2B, the representation 204 of the "New Object" button 110a has been dragged to an application window (e.g., a canvas) and the input device released. In one embodiment, in response, a GUI element such as a pop-up menu 222 is generated and displayed. In one embodiment, elements populating the pop-up menu 222 (or other GUI element) may be determined using a predictive approach based on past historical sequence data, such as that contained within action data 112. For example, it may be determined that 50% of the time the user created a "New Object," it was of type "Object A," 20% of the time the user created a "New Object," it was of type "Object D," and 10% of the time the user created a "New Object," it was of type "Object X." In one embodiment, it is determined that the aforementioned frequencies exceed a threshold frequency, and are thereby selected as likely to be utilized by the user, such as based on the interaction data. Therefore, the pop-up menu 222 in the example 220 of FIG. 2B is populated with "Object A," "Object D," and "Object X," and the user selects "Object D." In the example 240 of FIG. 2C, an new object 242 of type "Object D" is created and placed on the canvas, for example at a relatively approximate location where the user dragged the representation 204 of the "New Object" button 110a. In one embodiment, an additional pop-up menu or other GUI element could be utilized to add a property to the created object or modify the object on some way. For example, once the object is created and placed, then frequency-based and/or sequence-based data may be utilized to determine a likely property (or properties), modification (or modifications), etc. that may be selected and applied to the object.

Figure 3:
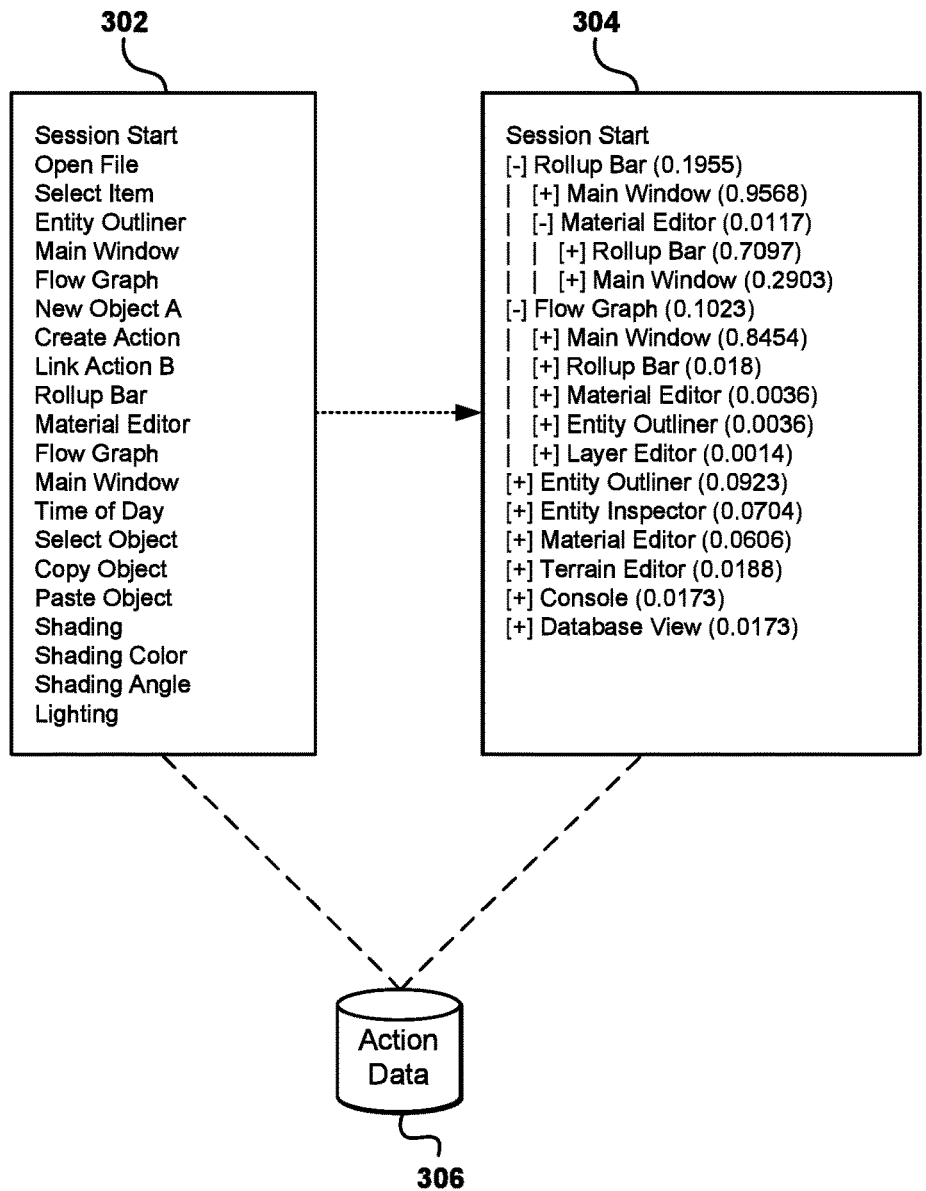
FIG. 3 illustrates an example embodiment utilizing event sequence data for providing predictive graphical user interface elements that can be used in accordance with various embodiments.

FIG. 3 illustrates an example 300 embodiment utilizing event sequence data for providing predictive graphical user interface elements that can be used in accordance with various embodiments. In the example 300 of FIG. 3, an example of interaction history data 302 including a historical sequence of types of interactions for a user is illustrated, which may also be considered a set of historical occurrences of event types 302 received by an application, as discussed previously. In one embodiment, the example set of interaction history data 302 may track a sequence of types of interactions a user has with a GUI of an application, which then results in the type of interaction being performed in an application. For example, "session start" can indicate the beginning of a user's session with an application (e.g., when the user runs an application). Then, the telemetry data received from an application (or the operating system, for example, depending on the implementation) indicates that the user selected an "Open File" command, then selected an item, then opened the "Entity Outline." These interactions may be considered "types" of interactions. For example, the user may, in a sequence of interactions as illustrated by element 302, have multiple instances of "Select Item." While each instance of the interaction is tracked in the sequence of interactions, there is only one type of "Select Item" interaction in an embodiment. The level of detail tracked in the historical sequence of interactions 302 may only be limited by various applications' reporting abilities. For example, an application may be unable to, or prevented from, tracking the exact type of item that is the subject of a "Select Item" action. In one embodiment, not only is the occurrence of a "Select Item" command recorded, but the type of item, one or more properties of the item, etc. may also be tracked such that the additional data may be utilized in an embodiment of the predictive GUI techniques.

In one embodiment, the historical sequence of interactions 302 may be processed to generate transition probability data 304. For example, transition probability data 304 may comprise frequency-related data that may be normalized by prior conditions (i.e., conditional probabilities or conditional likelihoods). For example, the discrete types of interactions in the historical sequence of interactions 302 are examined to determine what type of interaction occurs after a particular event type. For example, based on the interaction history data 302, it may be determined that after "session start," 19.55% of the time (e.g., a frequency of 0.1955), the user goes to the "Rollup Bar" GUI element, 10.23% of the time after a session start event type, the user goes to the "Flow Graph," 9.23% of the time the user goes to the "Entity Outliner," and so forth. According to an embodiment, transition probability data 304 may be based on an entire historical sequence of interactions 302, while in another embodiment, transition probability data 304 may be based on a subset of, or a truncated portion of, the historical sequence of interactions 302. In one embodiment, transition probability data 304 may be in a format that a user may peruse and manipulate, for example by collapsing and expanding various portions of representations of the data to expose more granular data. For example, it may be determined that after the user goes to the "Flow Graph," the user then goes to the "Main Window" 84.54% of the time, the "Rollup Bar" 1.8% of the time, the "Material Editor" 0.36% of the time, and so forth.

In one embodiment, the frequencies illustrated in the transition probability data 304, such as may be based on the interaction history data 302, are used to make a determination regarding which interactions are most likely to occur after a user's current action. As discussed earlier, the interaction history data 302 may comprise aggregate data for a number of users, as well as individual data for a particular user (in an embodiment, the individual user for whom the data is being utilized is not included in the aggregate data), and the transition probability data 304 may likewise by broken down into individual data and aggregate data. In one embodiment, a portion of the historical sequence of interactions 302 associated with an individual user used in determining likelihoods of various event types may be greater or less than a portion of the historical sequence of interactions 302 associated with an aggregate number of users used in the determination. In one embodiment, it may be determined what the aggregate number of users for whom data is gathered are most likely to do after a particular action, and this may be compared to what the individual user is most likely to do after a particular action. In one embodiment, the frequencies of various event types in the historical occurrences of event types 302 may be utilized to determine likelihoods of various event types being received (i.e., initiated by a user and/or an aggregate number of users) whether a set of transition probability data 304 is generated or not, as the transition probability data 304 is based on the historical occurrences of event types 302.

According to one embodiment, the frequencies associated with the historical occurrences of event types 302 (such as illustrated in the example of transition probability data 304) may be utilized in a determination whether the predictive GUI will be dynamically modified to include one or more of the event types received after the just-received event type. In one embodiment, in order to be considered for inclusion in the predictive GUI (e.g., as a button in a dynamic menu bar), the event type must meet a threshold likelihood (e.g., must be at least 20% likely to be the next event type the user sends to an application). In another embodiment, the interaction type having the highest frequency is utilized in a dynamic modification of the predictive GUI.

According to one embodiment, data in addition to, or in place of, the interaction history data 302 and transition probability data 304 may be utilized in order to make determinations regarding which event types are likely to be received after a particular event type (e.g., which type of interaction with a GUI is likely to be received after a particular interaction with a GUI is performed in the application). For example, data may be automatically or manually inserted into interaction history data 302 and/or transition probability data 304, or as part of data otherwise used in a determination regarding which event types are likely to be received after a particular event type. For example, a developer of an application may manually insert data that effectively operates as an "override" to cause a particular event to be designated as "likely," such that in one embodiment such an event may be selected to be displayed or otherwise made available with regard to a predictive GUI at varying times (e.g., always, upon a certain event, every X minutes or events, etc.). For example, a developer of an application may determine that a particular feature is being underutilized; therefore, in one embodiment, data may be inserted into interaction history data 302 and/or transition probability data 304 that results in the particular feature being made available with regard to a predictive GUI of the application regardless of frequency-related data (i.e., conditional probabilities or conditional likelihoods) that may indicate the particular feature does not meet a required threshold of frequency and/or likelihood, as discussed earlier.

According to one embodiment, a determined likelihood may be based on data other than frequency-related data. For example, a likelihood of a particular feature being selected as part of a predictive GUI may be determined based on a sequence-based model that does not utilize frequency-related data, as well as being based on a rule-based model that does not utilize predictive-based data or approaches in order to dynamically modify a GUI of an application. For example, based on a determined sequence of events/interactions/actions/etc., one or more potential next event/interaction/action/etc. may be determined and utilized, for example in a GUI of an application (e.g., a dynamic menu bar, etc.). A sequence-based model may in one embodiment be implemented using artificial intelligence approaches such as machine learning, classifiers, etc.

Figure 4:
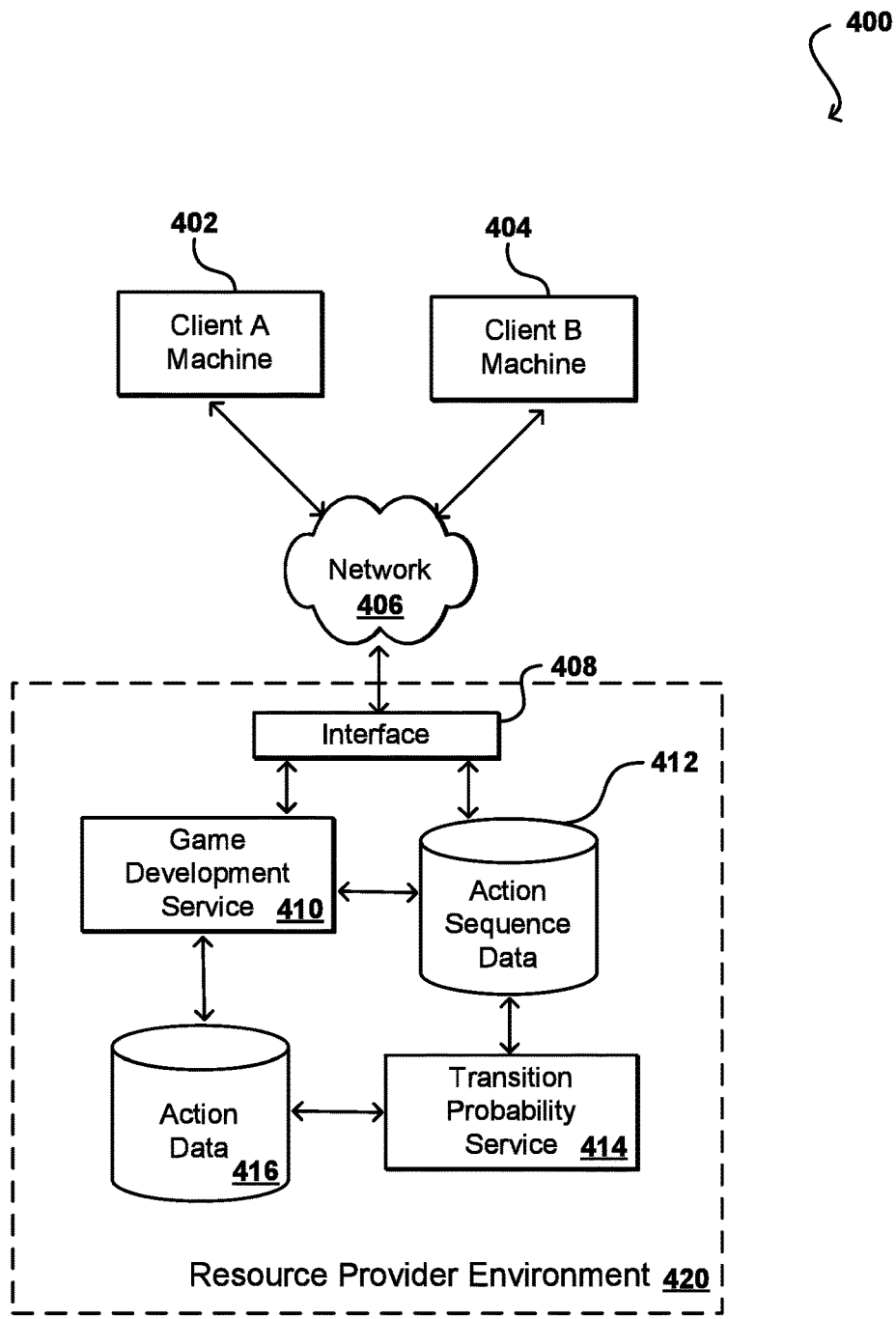
FIG. 4 illustrates an example resource environment for providing predictive graphical user interface elements that can be used in accordance with various embodiments.

FIG. 4 illustrates an example resource environment 400 for providing predictive GUI elements that can be used in accordance with various embodiments. In the example 400 of FIG. 4, two client machines are being used, one by client A 402 and one by client B. In an embodiment, each machine is executing a local copy of an application and telemetry data from an application is being stored on the machines. In one embodiment, at least one of client A 402 or client B 404 is in communication with a resource provider environment 420 over a network 406 such as the Internet. The resource provider environment may include an interface layer 408. The interface layer 408 can include application programming interfaces (APIs) or other exposed interfaces enabling a user to submit requests to the provider environment, as well as routing transmissions from clients such as client A 402 or client B 404 to an appropriate component of the resource provider environment 420. In one embodiment, interface layer 408 can also include other components as well, such as at least one Web server, routing components, load balancers, and the like. In one embodiment, the resource provider environment 420 includes data storage instances, such as for action data 416 (e.g., action data 112, interaction history data indicating a historical sequence of types of interactions, historical occurrences of event types, etc.). For example, client machine A 402 may transmit telemetry data to resource provider environment 420, which may be stored in a data storage instance such as action data 416. In one embodiment, action data 416 may then be used by a service in resource provider environment 420 such as a transition probability service 414, which in one embodiment transforms the raw interaction history data (e.g., action data 416) into a set of transition probability data, such as illustrated with regard to FIG. 3.

In one embodiment, Game Development Service 410 may generate and cause a predictive GUI to be dynamically modified based on transition probability data, such as provided by transition probability service and stored, for example in action sequence data 412. For example, if an application executing on client A 402 is in communication with resource provider environment 420, such as by sending action data to resource provider environment 420 for processing, then Game Development Service 410 may provide commands to be sent back to client A 402 for an application to use in modifying the predictive GUI. In one embodiment, such as where client B 404 is in communication with an instance of an application executing at resource provider environment 420, such as in a SaaS-type implementation, Game Development Service 410 may perform tasks such as gathering telemetry data from client B's interactions with an application and providing it to various components/services at resource provider environment 420.

Figure 5:
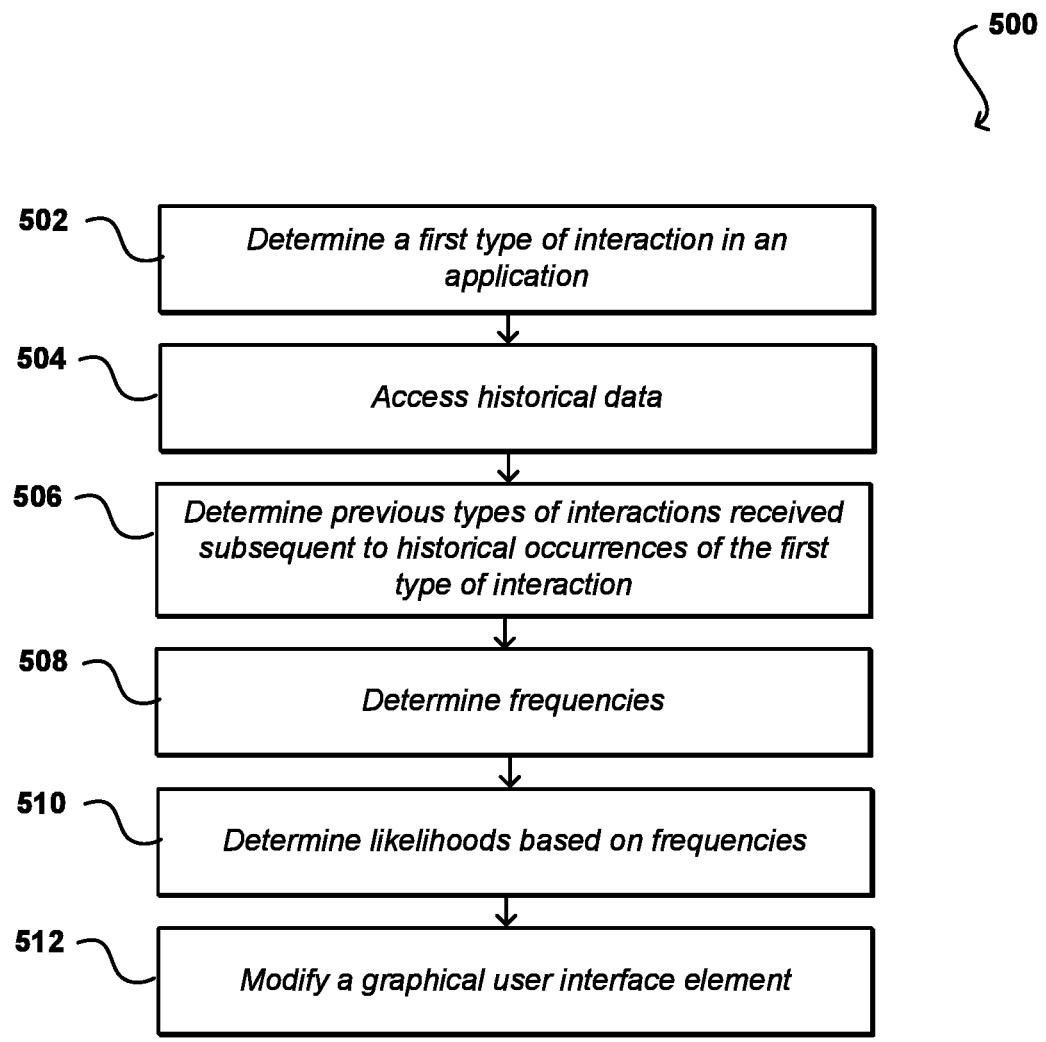
FIG. 5 illustrates an example process for providing predictive graphical user interface elements that can be used in accordance with various embodiments.

FIG. 5 illustrates an example process 500 for providing predictive graphical user interface elements that can be used in accordance with various embodiments. It should be understood for this and other processes discussed herein that there can be additional, alternative, or fewer steps performed in similar or alternative orders, or in parallel, within the scope of the various embodiments unless otherwise stated. In this example, a first type of interaction in an application is determined 502. For example, it may be an interaction with a GUI element of an application, an event type received by an application, etc. For example, a scripting interface may allow a user to provide an input, such as through a text-based command line interface or a logical pipe having access to an application in order to perform actions. In one embodiment, in response to receiving and determining the interaction, historical data is accessed 504; for example, a set of historical occurrences of action/events/interactions may be stored locally or remotely, as discussed earlier. In one embodiment, the first type of interaction determined is located in the historical data, and the types of interactions identified in the historical data as previously occurring subsequent to the first type of interaction are then determined 506; for example, immediately after the first type of interaction in the historical data, which may comprise a sequence of interactions that can be determined based on telemetry data from an application.

In one embodiment, a frequency corresponding to a number of times each of the previous types of interactions follows the first type of interaction in the sequence history data is determined 508. For example, a percentage of time that a particular interaction type immediately followed the first type of interaction, a percentage of time that another particular interaction type immediately followed the first type of interaction, etc. In one embodiment, based on the frequencies, threshold likelihoods may be determined 510. For example, if two different types of interactions follow a first type of action 50% of the time and 25% of the time, respectively, then it is determined whether both of the frequencies meet a threshold amount in order to be considered "likely" to be used by the user directly after the first type of interaction. In one embodiment, based at least on the threshold likelihoods, a GUI element may be modified 512. For example, a dynamic menu bar may have one or more of the buttons on it dynamically modified to reflect one or more of the likely interactions previously determined. In one embodiment where a scripting interface is utilized, instead of modifying a GUI element, one or more types of data may be "placed" in a pipeline to be delivered to an application, for example at the user's command.

Figure 6:
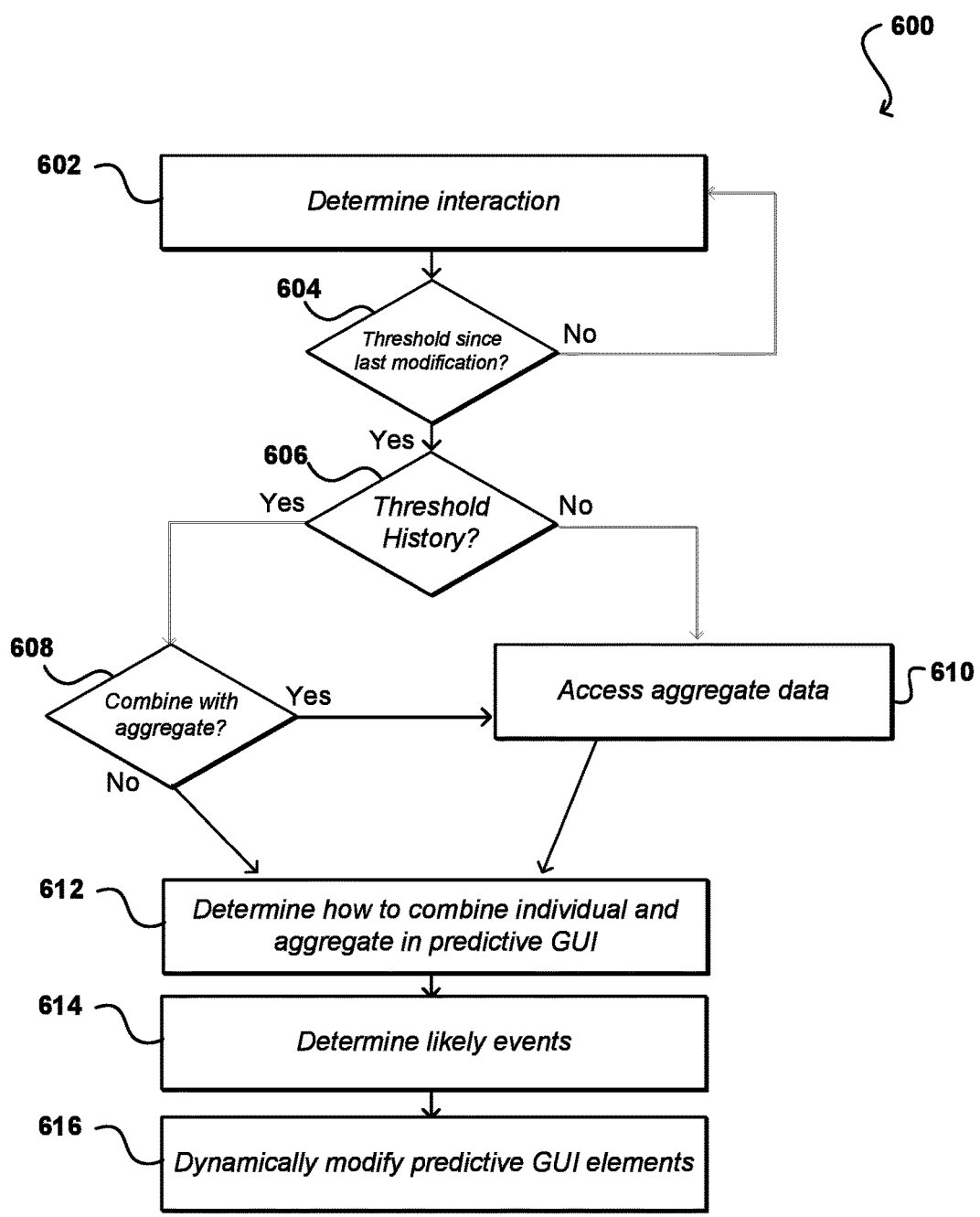
FIG. 6 illustrates an example process for providing predictive graphical user interface elements that can be used in accordance with various embodiments.

FIG. 6 illustrates an example process 600 for providing predictive graphical user interface elements that can be used in accordance with various embodiments. In one embodiment, an interaction with an application is determined 602, as described herein. In one embodiment, a determination is made whether a threshold amount of time or other measure has been exceeded 604 since a last modification to the predictive GUI. For example, if the predictive GUI comprises a dynamic menu bar with buttons, a determination is made as to the last time one of the buttons was modified. If, in one embodiment, at least a certain amount of time has passed since the last modification, then control proceeds to the next step. Otherwise, a next interaction is determined.

In one embodiment, if the threshold is met, then a determination is made whether the individual associated with an application has generated enough interaction history data 606. For example, as discussed earlier, a new user to an application may not have generated a sufficient amount of event/interaction history to provide for accurate predictions. In one embodiment, if sufficient individual history is available, then control proceeds to determine whether aggregate data should also be considered 608 in making a determination regarding the most likely next events. If it is, or if insufficient individual history exists, then aggregate data is accessed 610. If aggregate data is not to be considered, then control passes to step 612 without accessing aggregate data; similarly, if aggregate data has been accessed, then control passes to step 612, where a determination is made 612 regarding how to combine individual and aggregate data. For example, in one embodiment, such as where a dynamic menu bar is used, a certain number of buttons may be reserved for individual predictions and a certain number reserved for aggregate predictions, as discussed earlier. In one embodiment, one or more likely events are determined 614; for example, by analyzing frequencies associated with subsequent interactions/events in the sequence history data. The predictive GUI is then modified accordingly 616. For example, two buttons on a dynamic menu bar are modified to reflect the two most likely subsequent interactions according the individual data and two buttons are dynamically modified to reflect two most likely subsequent interactions according the aggregate data.

Figure 7:
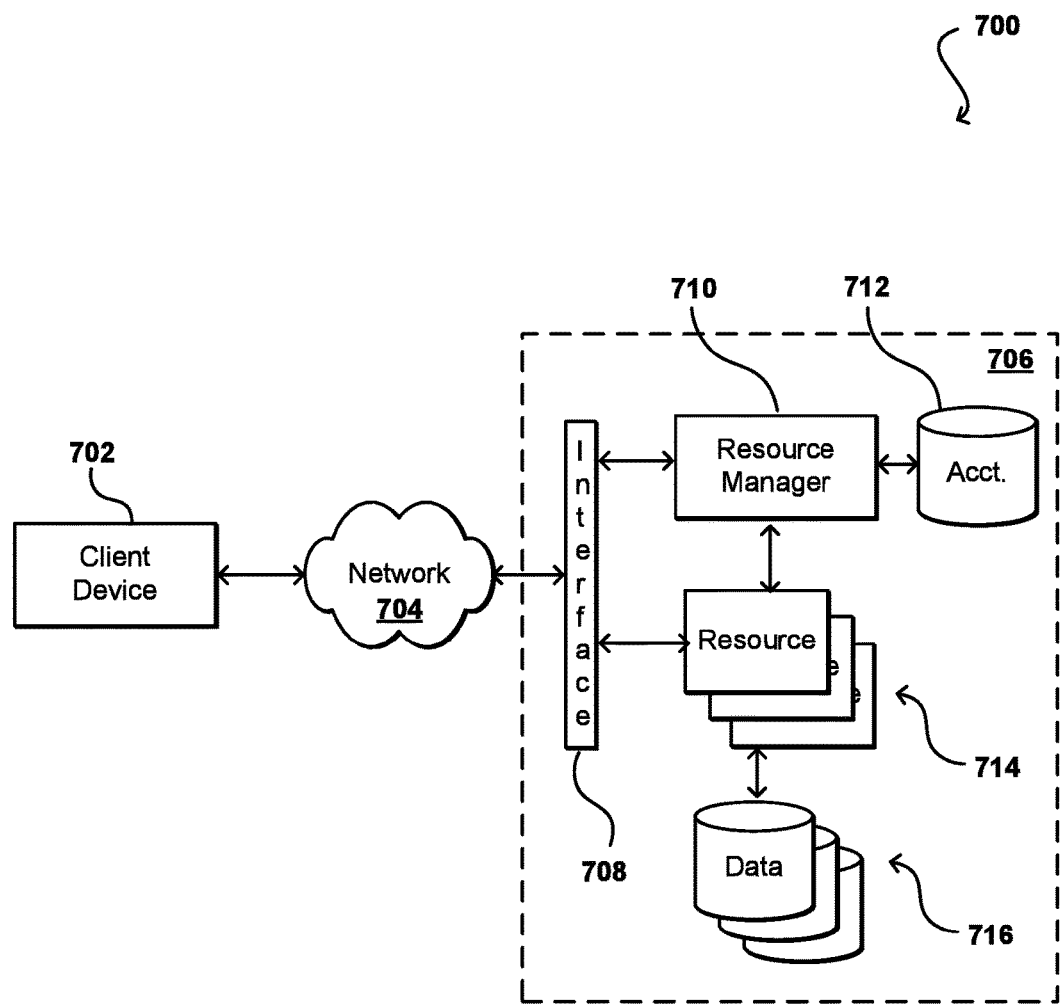
FIG. 7 illustrates an example resource environment for providing predictive graphical user interface elements that can be used in accordance with various embodiments.

FIG. 7 illustrates an example resource environment for providing predictive graphical user interface elements that can be used in accordance with various embodiments. In this example, a user is able to utilize a client device 702 to submit requests across at least one network 704 to a multi-tenant resource provider environment 706. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 704 can include any appropriate network, including an intranet, the Internet, a cellular network, a local area network (LAN), or any other such network or combination, and communication over the network can be enabled via wired and/or wireless connections. The resource provider environment 706 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of resources that can be utilized by multiple users for a variety of different purposes. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 714 of one or more types. These types can include, for example, application servers operable to process instructions provided by a user or database servers operable to process data stored in one or more data stores 716 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 714 can submit a request that is received to an interface layer 708 of the provider environment 706. The interface layer can include application programming interfaces (APIs) or other exposed interfaces enabling a user to submit requests to the provider environment. The interface layer 708 in this example can also include other components as well, such as at least one Web server, routing components, load balancers, and the like. When a request to provision a resource is received to the interface layer 708, information for the request can be directed to a resource manager 710 or other such system, service, or component configured to manage user accounts and information, resource provisioning and usage, and other such aspects. A resource manager 710 receiving the request can perform tasks such as to authenticate an identity of the user submitting the request, as well as to determine whether that user has an existing account with the resource provider, where the account data may be stored in at least one data store 712 in the provider environment. A user can provide any of various types of credentials in order to authenticate an identity of the user to the provider. These credentials can include, for example, a username and password pair, biometric data, a digital signature, or other such information. The provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 702 to communicate with an allocated resource without having to communicate with the resource manager 710, at least until such time as a relevant aspect of the user account changes, the user is no longer granted access to the resource, or another such aspect changes.

The resource manager 710 (or another such system or service) in this example can also function as a virtual layer of hardware and software components that handles control functions in addition to management actions, as may include provisioning, scaling, replication, etc. The resource manager can utilize dedicated APIs in the interface layer 708, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 708 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

As mentioned, such an environment enables organizations to obtain and configure computing resources over a network such as the Internet to perform various types of computing operations (e.g., execute code, including threads, programs, software, routines, subroutines, processes, etc.). Thus, developers can quickly purchase or otherwise acquire a desired amount of computing resources without having to worry about acquiring physical machines. Such computing resources are typically purchased in the form of virtual computing resources, or virtual machine instances. These instances of virtual machines, which are hosted on physical computing devices with their own operating systems and other software components, can be utilized in the same manner as physical computers.

In many such environments, resource instances such as virtual machines are allocated to a customer (or other authorized user) for a period of time in order to process tasks on behalf of that customer. In many cases, however, a customer may not have a steady flow of work such that the customer must maintain a sufficient number of virtual machines to handle peak periods of work but will often have less than this amount of work. This can result in underutilization and unneeded expense for both the customer and the resource provider. Approaches in accordance with various embodiments can instead allocate resource instances or a task or event basis. A resource instance can be allocated in response to a customer request or event, and once the processing is complete that instance can either be made available for processing a different event or destroyed, among other such options. In either case, the customer will not be charged for more processing by the instance than was needed for the particular request or event.

Figure 8:
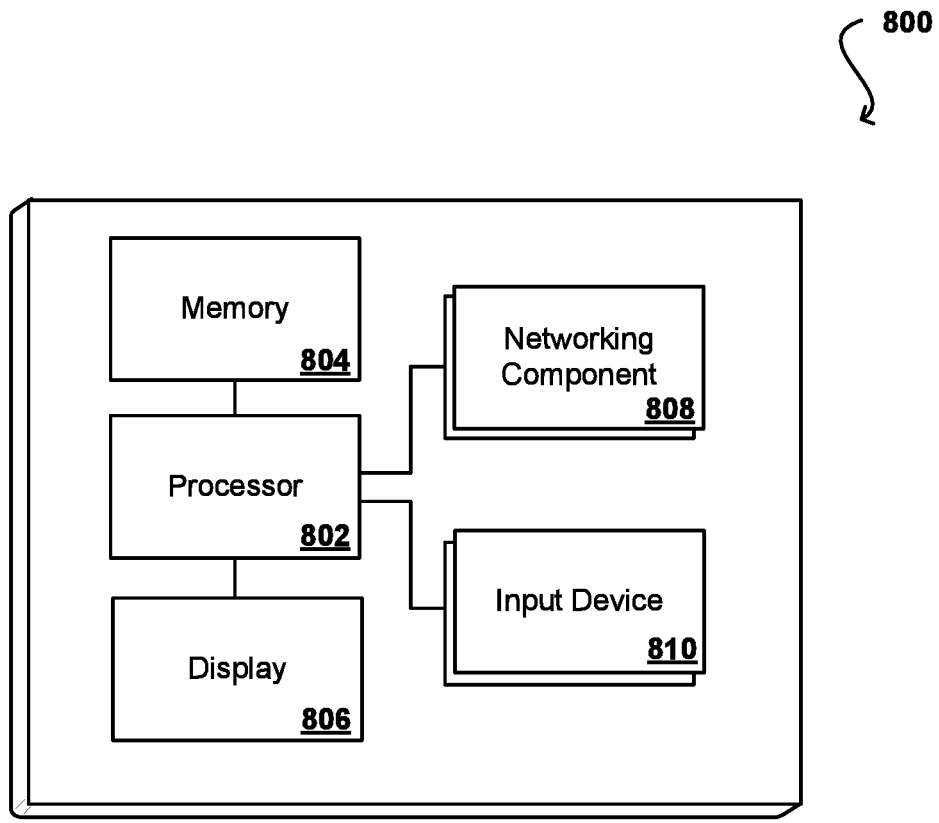
FIG. 8 illustrates example components of a computing device that can be used to implement aspects of the various embodiments.

FIG. 8 illustrates a set of basic components of an example computing device 800 that can be utilized to implement aspects of the various embodiments. In this example, the device includes at least one processor 806 for executing instructions that can be stored in a memory device or element 804. As would be apparent to one of ordinary skill in the art, the device can include many types of memory, data storage or computer-readable media, such as a first data storage for program instructions for execution by the at least one processor 802, the same or separate storage can be used for images or data, a removable memory can be available for sharing information with other devices, and any number of communication approaches can be available for sharing with other devices. The device may include at least one type of display element 806, such as a touch screen, electronic ink (e-ink), organic light emitting diode (OLED) or liquid crystal display (LCD), although devices such as servers might convey information via other means, such as through a system of lights and data transmissions. The device typically will include one or more networking components 808, such as a port, network interface card, or wireless transceiver that enables communication over at least one network. The device can include at least one input device 810 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

As discussed, different approaches can be implemented in various environments in accordance with the described embodiments. As will be appreciated, although a Web-based environment is used for purposes of explanation in several examples presented herein, different environments may be used, as appropriate, to implement various embodiments. The system includes an electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. An application server can include any appropriate hardware and software for integrating with the data store as needed to execute aspects of one or more applications for the client device and handling a majority of the data access and business logic for an application. An application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and an application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from an application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or notebook computers running a standard operating system, as well as cellular, wireless and handheld devices running mobile software and capable of supporting a number of networking and messaging protocols. Devices capable of generating events or requests can also include wearable computers (e.g., smart watches or glasses), VR headsets, Internet of Things (IoT) devices, voice command recognition systems, and the like. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   determining a first type of interaction with a graphical user interface (GUI) of an application executing on a computing device;
   accessing a first set of interaction history data indicating a historical sequence of types of interactions received by the GUI of the application;
   determining, in the first set of interaction history data, one or more previous instances of the first type of interaction, at least one of the one or more previous instances of the first type of interaction being followed in the historical sequence of interactions by one of a set of types of subsequent interactions with the GUI of the application;

determining a frequency corresponding to a number of times each subsequent interaction type of the set of types of subsequent interactions follows the first type of interaction in the historical sequence of interactions;

selecting the subsequent interaction type having the highest respective frequency;

determining an interval since the GUI was previously dynamically modified to display a selectable interface element;

determining that the interval exceeds a threshold value; and causing the GUI to be dynamically modified to display a selectable interface element corresponding to the subsequent interaction type having the highest respective frequency.

2. The computer-implemented method of claim 1, further comprising:

receiving an indication of a selection of the selectable interface element; and causing, in response to receiving the indication, an instance of the subsequent interaction type having the highest respective frequency to be performed in the application.

3. The computer-implemented method of claim 1, wherein the first set of interaction history data is associated with a user, and further comprising:

accessing a second set of interaction history data indicating a historical sequence of types of interactions received by the GUI of the application executing on a plurality of other computing devices, wherein the second set of interaction history data is associated with a plurality of other users.

4. The computer-implemented method of claim 1, further comprising:

receiving an indication of an interaction with the selectable interface element;

causing, in response to the indication, the GUI subsequently to be dynamically modified to display the selectable interface element corresponding to the subsequent interaction type in response to determining the first type of interaction with the GUI, wherein the subsequent dynamic modification occurs without regard to whether the subsequent interaction type has the highest respective frequency.

5. A computer-implemented method, comprising:

determining a first event type received by an application executing on a computing device;

determining a first set of historical occurrences of the first event type received by the application;

determining, for each of the first set of historical occurrences of the first event type, a first frequency that a second event type was received by the application after each respective historical occurrence of the first event type;

determining, based on the first frequency, that the second event type meets a threshold likelihood of being received after the first event type;

determining an interval since the first interface element was previously dynamically modified;

determining that the interval exceeds a threshold value; and dynamically modifying a first interface element in a graphical user interface (GUI) of the application such that the first interface element is associated with the second event type.

6. The computer-implemented method of claim 5, further comprising:

receiving an indication of an interaction with the first interface element; and causing, in response to receiving the indication, an occurrence of the second event type to be performed by the application.

7. The computer-implemented method of claim 5, further comprising:

determining that the first interface element in the GUI is associated with a third event type capable of being performed by the application; and determining, based on the first set of historical occurrences, that a threshold likelihood of the third event type being received after the first event type is less than the threshold likelihood of the second event type being received after the first event type; and wherein an occurrence of the second event type is performed by the application upon receiving an indication of an interaction with the first interface element.

8. The computer-implemented method of claim 5, wherein the first set of historical occurrences is determined based on data describing a sequence of interactions by a particular user with the application, and further comprising:

determining a second set of historical occurrences of the first event type received by the application based on aggregate data describing a plurality of sequences of interactions with the application, each of the plurality of sequences being associated with one user of a plurality of users other than the particular user.

9. The computer-implemented method of claim 8, further comprising:

determining, for each of the second set of historical occurrences of the first event type, a second frequency that a third event type was received by the application after each respective historical occurrence of the first event type; and dynamically modifying a second interface element in the GUI of the application such that the second interface element is associated with the third event type.

10. The computer-implemented method of claim 9, wherein the first interface element and the second interface element are part of a composite interface element, and further comprising:

determining a positioning of the first interface element and the second interface element in the composite interface element based on a comparison of the first frequency and the second frequency.

11. The computer-implemented method of claim 8, further comprising:

determining, for each of the first set of historical occurrences of the first event type, a second frequency that a third event type was received by the application after each respective historical occurrence of the first event type;

determining, for each of the second set of historical occurrences of the first event type, a third frequency that the third event type was received by the application after each respective historical occurrence of the first event type;

determining that the second frequency exceeds the third frequency by a threshold amount; and dynamically modifying a second interface element in the GUI such that the second interface element is associated with the third event type.

12. The computer-implemented method of claim 5, further comprising:

determining that the second event type has been performed by the application fewer than a threshold number of times; and increasing the threshold likelihood.

13. The computer-implemented method of claim 5, wherein the first set of historical occurrences is determined based on data describing a sequence of interactions by a particular user with the application, and further comprising:

prior to dynamically modifying the first interface element, determining that the particular user has used the application for a threshold amount of time.

14. The computer-implemented method of claim 5, wherein the first event type or the second event type comprises at least one of an action being performed by a user, a feature of the application being performed by the application, a GUI element of the application being interacted with, an object being created in the application, or a session of the application being initiated.

15. A system, comprising:

at least one processor; and memory including instructions that, when executed by the at least one processor, cause the system to:

determine a first event type received by an application executing on a computing device;

determine a set of historical occurrences of the first event type received by the application;

determine, for each of the set of historical occurrences of the first event type, a first frequency that a second event type was received by the application after each respective historical occurrence of the first event type;

determine, based on the first frequency, that the second event type meets a threshold likelihood of being received after the first event type;

determine an interval since the first interface element was previously dynamically modified;

determine that the interval exceeds a threshold value prior to dynamically modifying the first interface element in the GUI of the application such that the first interface element is associated with the second event type; and dynamically display a first interface element corresponding to the second event type in a graphical user interface (GUI) of the application.

16. The system of claim 15, wherein the first set of historical occurrences is determined based on data describing a sequence of interactions by a particular user with the application, and wherein the instructions when executed further cause the system to:

determine a second set of historical occurrences of the first event type received by the application based on aggregate data describing a plurality of sequences of interactions with the application, each of the plurality of sequences being associated with one user of a plurality of users other than the particular user.

17. The system of claim 16, wherein the instructions when executed further cause the system to:

determine, for each of the second set of historical occurrences of the first event type, a second frequency that a third event type was received by the application after each respective historical occurrence of the first event type; and dynamically modify a second interface element in the GUI of the application such that the second interface element is associated with the third event type.

* * * * *